US008156250B2

(12) United States Patent
Parcher et al.

(10) Patent No.: US 8,156,250 B2
(45) Date of Patent: Apr. 10, 2012

(54) ARRANGEMENTS FOR A 3270 COMPATIBLE TERMINAL WITH BROWSER CAPABILITY

(76) Inventors: James Tyler Parcher, Jamestown, TX (US); Denis Neuhart, Erstein (FR)

( * ) Notice: Subject to any disclaimer, the term of this patent is extended or adjusted under 35 U.S.C. 154(b) by 363 days.

(21) Appl. No.: 11/978,292

(22) Filed: Oct. 29, 2007

(65) Prior Publication Data

US 2009/0113017 A1    Apr. 30, 2009

(51) Int. Cl.
*G06F 15/16* (2006.01)
(52) U.S. Cl. ............................................. 709/246
(58) Field of Classification Search .................. 709/246
See application file for complete search history.

(56) References Cited

U.S. PATENT DOCUMENTS

| 5,958,013 | A | * | 9/1999 | King et al. | 709/227 |
| 5,964,836 | A | * | 10/1999 | Rowe et al. | 709/221 |
| 6,067,579 | A | * | 5/2000 | Hardman et al. | 719/328 |
| 6,122,276 | A | * | 9/2000 | Boe et al. | 370/389 |
| 6,338,089 | B1 | * | 1/2002 | Quinlan | 709/227 |
| 6,338,096 | B1 | * | 1/2002 | Ukelson | 719/319 |
| 6,397,253 | B1 | * | 5/2002 | Quinlan et al. | 709/227 |
| 6,480,895 | B1 | * | 11/2002 | Gray et al. | 709/231 |
| 6,557,043 | B1 | * | 4/2003 | Fletcher | 709/231 |
| 6,571,292 | B1 | | 5/2003 | Fletcher | |
| 6,934,952 | B2 | * | 8/2005 | Sarkar et al. | 719/310 |
| 6,993,476 | B1 | * | 1/2006 | Dutta et al. | 704/9 |
| 2004/0015839 | A1 | * | 1/2004 | Sarkar et al. | 717/108 |
| 2004/0205612 | A1 | * | 10/2004 | King et al. | 715/522 |
| 2005/0044197 | A1 | * | 2/2005 | Lai | 709/223 |
| 2010/0042709 | A1 | * | 2/2010 | Liesche et al. | 709/222 |

* cited by examiner

*Primary Examiner* — George C Neurauter
(74) *Attorney, Agent, or Firm* — Alan Carlson

(57) ABSTRACT

Disclosed herein is a system that includes a 3270 compatible terminal that can accept browser compatible languages in a 3270 format and process these languages and display such languages in graphical user interface format. In some embodiments it can appear that the browser performs as a "plug-in" to the 3270 application. As utilized herein, a plug is a software module that can "plugs in" to another application under current execution to give the currently running application specific additional functionality.

19 Claims, 7 Drawing Sheets

700 SLU Embodiment 2 Flow

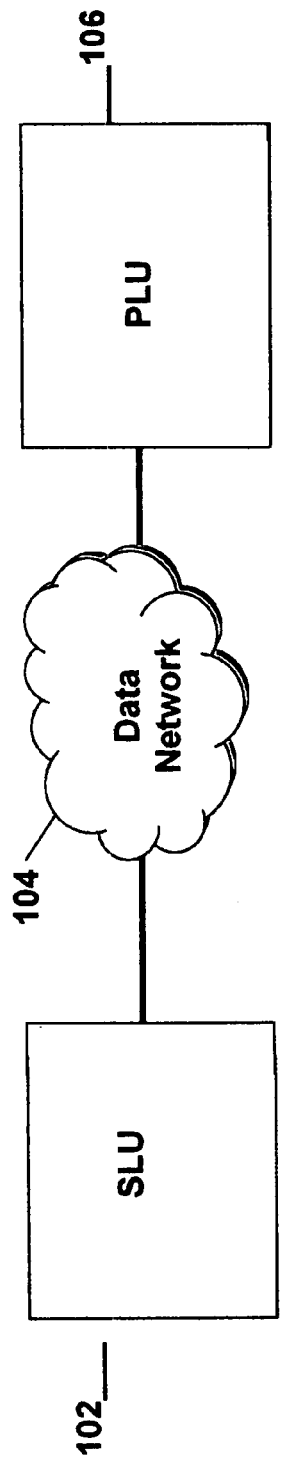
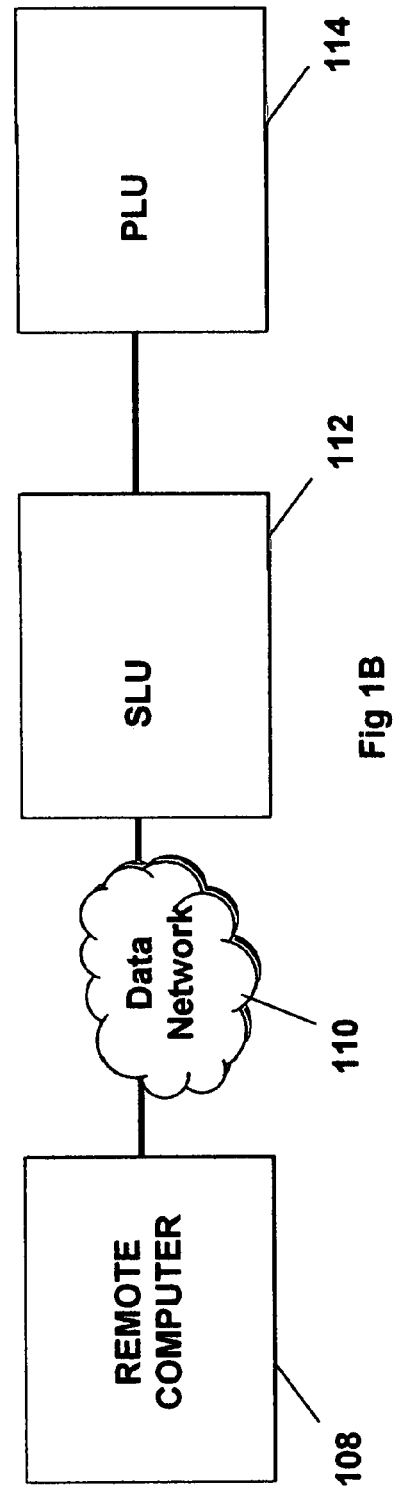

ARRANGEMENTS FOR A 3270 COMPATIBLE TERMINAL WITH BROWSER CAPABILITY

FIELD

The present disclosure relates generally to computing systems and more particularly to a 3270 compatible computing system with an integrated browser.

BACKGROUND

The International Business Machine Corporation (IBM) 3270 communication protocol supported by the model 3270 terminal is a relatively old system. The "3270" class of computer terminal has been manufactured and sold by IBM since 1972. The term "3270" is also utilized to denote a type of protocol utilized by 3270 compatible terminals to communicate with a mainframe computer. The 3270 terminal is generally a "smart display device" that has at least one microprocessor and a 3270 terminal can receive and display data and communicate utilizing blocks or packets of data.

The 3270 terminal can be referred to as a secondary logical unit (SLU) where the mainframe can be referred to as a primary logical unit or (PLU). Unlike common mainframe terminal protocols, functionally the 3270 protocol minimizes the number of input/output interrupts during operation by accepting large blocks of data in a 3270 data stream. Accordingly, the 3270 protocol/system utilizes a high speed proprietary communications interface. Thus, although a 3270 is a relatively old system/protocol/architecture it is still functional and currently in use in many forms. A 3270 system still provides a robust and secure communication and computing environment.

IBM stopped manufacturing the 3270 years ago, however many vendors provide emulation software that can be loaded onto a personal computer such that a personal computer can operate as a 3270 terminal. Thus, the IBM 3270 protocol is still commonly used via emulation on a personal computer and such a configuration allows users to access mainframe-based applications. Some attempts at modernizing 3270 terminals include the use of a technique known as "screen scraping." In such a technique a non 3270 system can receive and capture 3270 screen data and can transfer the data into a modern display format such as a Microsoft Windows™ format. Such a process is less than perfect because to screen scrape the computer must leave the secure 3270 communication mode making the mainframe and the 3270 compatible terminal susceptible to hacking and other corruption. Today, many businesses still find the 3270 system to be very productive and efficient and often cannot justify spending the resources to replace the 3270 system with more modern/expensive systems with compatible security.

Current mainframe computers still provide the fastest execution speeds in a secure environment in a centralized manner and thus, are robust and provide the required control and security for many industries. For these reasons, and many more there continues to be a place for mainframe computing in the machine hierarchy with multiple remote user terminals. In contrast, efforts to improve the user-to-mainframe interface, particularly for legacy mainframe computers seem to be lacking. Much of the data entry and programming work on mainframes today is accomplished with microprocessor based terminals or equipment that is designed to emulate the characteristics of the mainframe and terminals that were utilized in the 1960's and 1970's.

The 3270 protocol supports communications for the IBM series of mainframe computers that can operate on an IBM 360 mainframe instruction set. In the typical network deployment data can be exchanged between a host computer or PLU and a client application or a compatible terminal as defined in IBM's System Network Architecture (hereinafter, "SNA") and a user terminal or terminal server or the SLU. The 3270 protocol defines sending and receiving data in blocks and the terminals can request retransmission of data. The 3270 terminal has been so long the established standard that many lines of application code have been written that depend on the exact characteristic behavior of this terminal model. The 3270 terminal has been so widely emulated by third parties that the 3270 data formatted stream on which it operates has become an industry standard. However, the basic 3270 terminal has fallen out of favor in state-of-the-art computing because of its limited capabilities. For example, graphical user interfaces (GUI)s are very popular in today's computing environment, yet the 3270 terminal generally does not support such an "advanced" format.

For example, a popular GUI utilized by many, is provided by Web browser applications or a "browser." A browser application can denote software that can be utilized to receive and process web compatible languages such as a hypertext markup language (HTML). Browsers are generally well accepted by users and provide excellent flexibility as to what functions they provide and what they can accomplish for a user. For example, a browser can allow a user to interact with displayed text, images, videos, music and other data. Browsers allow a user to quickly and easily access information by pointing and clicking on icons and selecting links or traversing links using a pointing device such as a mouse. Browsers can also format information/data or commands into an HTML format such that many different GUIs can display the data. The GUI can provide an improved appearance of a data or Web page as compared to traditional terminals. Although browsers are typically used to access the World Wide Web, they can also be used to access information provided by mainframes in private networks or can be effectively utilize to access content in file systems for example banking records.

The most commonly used HTTP is HTTP/1.1, which is fully defined in request for comments 2616. Most browsers natively support a variety of formats in addition to HTML, such as the JPEG, PNG, and GIF image formats, and most browsers can be extended to support more data formats through the use of browser compatible plug-ins. These formats can be generally referred to as "web compatible" formats. The combination of HTTP type content and URL protocol specifications allow Web page designers to embed images, animations, video, sound, and streaming media into a Web page, enhancing a user's experience. Some of the more popular browsers include additional components to support "Usernet" news, IRC (Internet relay chat), and e-mail capabilities. Protocols supported may include NNTP (network news transfer protocol), SMTP (simple mail transfer protocol), IMAP (Internet message access protocol), and POP (post office protocol). These browsers are often referred to as Internet suites or application suites rather than merely Web browsers, however all of these protocols are considered "Web compatible."

Generally, there has been a lack of significant improvement in mainframe terminal technology over the last few decades. Accordingly, what is needed is a different kind of SLU processing that uses the robust network and security already established by the 3270 while modernizing the user interface.

SUMMARY

The problems identified above are in large part addressed by the systems, arrangements, methods and media disclosed herein to provide a 3270 compatible terminal with an integrated browser or a browser "plug-in" capability. In some embodiments the 3270 compatible terminal can seamlessly blend features provided by legacy 3270 terminals with Web content processing features such as a graphical user interface. Thus, the 3270 compatible terminal can display data that conforms to Web standards such as data that conforms to an HTML format, while operating in a 3270 communication session with a mainframe computer. Accordingly, a user can interact with a browser supported graphical user interface (GUI) and such an interaction can be placed in a 3270 format and communicated back to the mainframe.

In some embodiments, a method is disclosed that receives a transmission in a 3270 compatible format, where the transmission can include browser compatible data. The method can also include detecting a trigger in the transmission, activating a browser engine in response to the detected trigger, and processing the browser compatible data with the browser engine. In some embodiments the 3270 compatible terminal can receive a query from a mainframe computer regarding whether the 3270 compatible terminal has browser capabilities. If the 3270 compatible terminal has browser capabilities the 3270 compatible terminal can transmit a reply to the query affirming that the 3270 compatible terminal has the capability. In other embodiments the browser compatible data can be displayed in a graphical user interface format. If a user exits the 3270 session, for example by selecting a hyperlink in the GUI, the system can detect such a change (which typically suspends the 3270 communication session) and provide for multiple recovery options. These recovery options may be user selectable.

Recovery options can include creating an error message and/or returning to the previously displayed page. In other embodiments the system can force the previously displayed screen to be restored on a display. If a subsequent transmission is received that does not have a trigger then the browser engine can be deactivated and the 3270 compatible terminal can revert to a traditional 3270 display mode. The browser compatible data can take many forms such as a hypertext markup language (HTML) format. The HTML data can be embedded in the 3270 compatible transmission. Thus, the compatible terminal and/or the browser engine can unwrap 3270 type packets and the browser can process and display the hypertext mark-up language.

In another embodiment, a system is disclosed. The system can include a 3270 data stream manager module to process a 3270 compatible data stream received from a 3270 compatible application, the 3270 compatible application to envelope a browser compatible language into the 3270 compatible data stream. The system can also include a trigger detector module to detect a trigger in 3270 compatible data stream and a browser engine to receive and process the browser compatible language in response to the detected trigger.

In yet another embodiment, a data stream manager can activate the browser engine and provide the 3270 compatible data stream to the browser engine based on the detection of the trigger. In addition, the switch can switch the data stream to the browser engine in response to the trigger. In some embodiments a query reply module can respond to a query from a mainframe computer affirming that the 3270 compatible terminal has a browser capability. In some embodiments the 3270 compatible terminal can have a session state module to detect if a currently displayed page does not reflect the latest transmission from the mainframe and can invoke a recovery mode.

In another embodiment, a machine-accessible medium containing instructions which, when the instructions are executed by a machine, cause the machine to perform operations. Such operations can include receiving a transmission in a 3270 compatible format, detecting a trigger in the transmission, activating a browser engine in response to the detected trigger, and processing the browser compatible data with the browser engine.

The 3270 compatible terminal can also provide other terminal behaviors that can conduct Web interactions. For example the browser engine may provide translations between 3270 compatible format and hypertext mark-up language (HTML). Some embodiments can include a database in the mainframe to associate and enforce the pairing of a set of captured input data with a set of terminal display data where the display data is data utilized to capture the user input. This feature allows a terminal user to change the terminal display mode a 3270 session to an off-line browser session such that the terminal can "stray" from the 3270 session to a browser activity within the 3270 session and the 3270 compatible terminal can return to the 3270 session without having to breakdown or leave the 3270 session. The system can deliver Web type content to the user and can directly display the content as if it is received in place of 3270 standard data display.

The system can operate in such a browser mode without bypassing long established and tested security access barriers built in to the communications support systems for 3270. Architectures that bypass 3270 communications handling require legacy software applications to be reworked for the new interface, which is an expensive undertaking. A middle tier server may be required to enforce session control in such architectures to map each terminal user to a particular task tread of the application in the mainframe.

BRIEF DESCRIPTION OF THE DRAWINGS

Aspects of the invention will become apparent upon reading the following detailed description and upon reference to the accompanying drawings in which, like references may indicate similar elements:

FIG. 1A is a high level block diagram of hybrid browser/3270 display processor;

FIG. 1B is a high level block diagram of a mid tier embodiment with browser/3270 capability;

DETAILED DESCRIPTION

Figure 2:
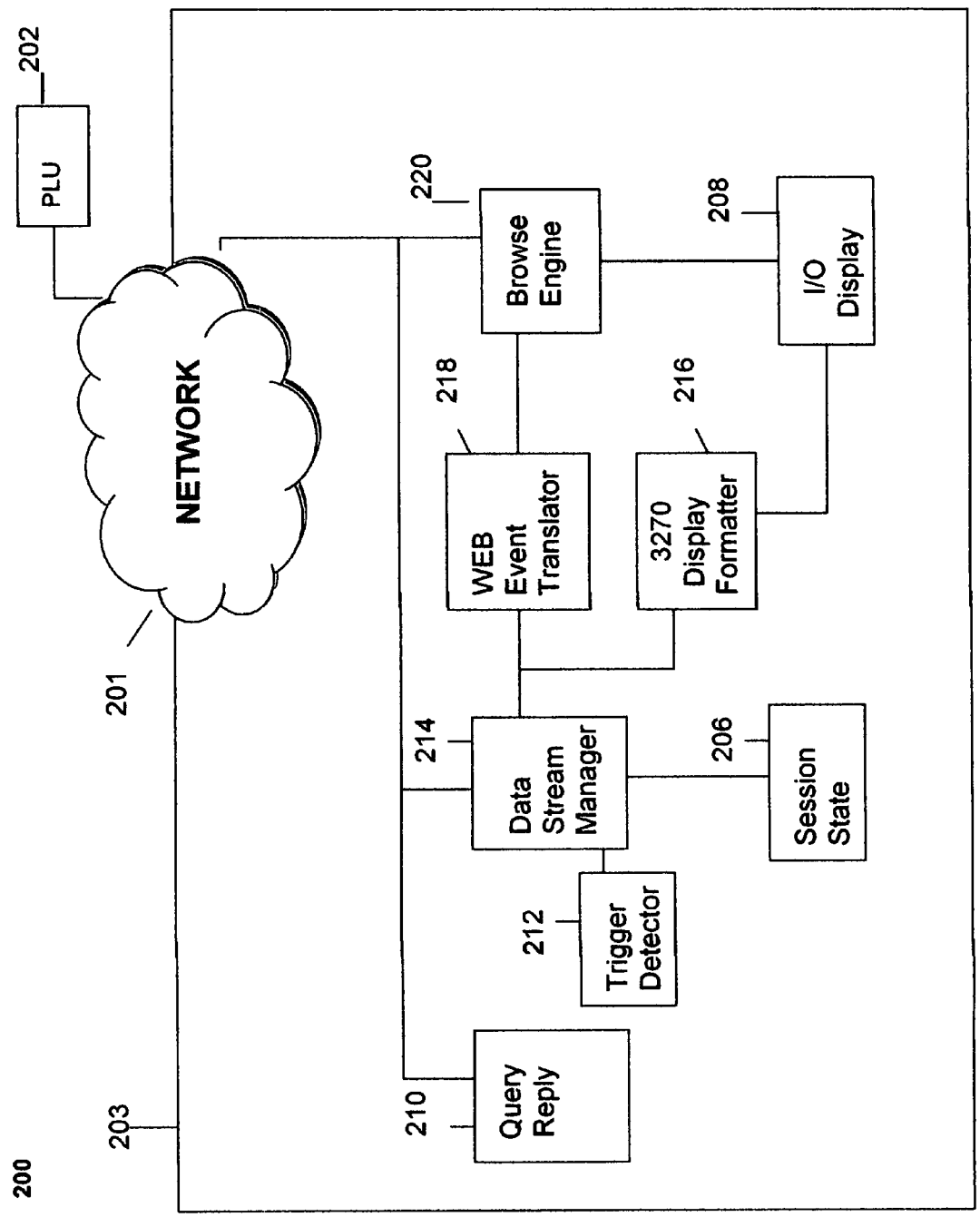
FIG. 2 is a block diagram of a hybrid browser/3270 terminal.

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

Disclosed herein is a system that includes a 3270 compatible terminal that can communicate utilizing Web or browser compatible languages in a 3270 format. The terminal can process these languages and display these languages in a browser type graphical user interface. In some embodiments it can appear that the browser performs as a "plug-in" to the 3270 application or that the browser is integrated with the 3270 processing application. As utilized herein, a plug-in is a software module that can "plugs in" to another application under current execution to give the currently running application specific additional functionality.

In some embodiments, the 3270 compatible terminal can seamlessly blend features provided by legacy 3270 terminals with Web content processing features. For example, the disclosed configuration provides a user with a GUI to interact with an IBM 360 mainframe. Thus, the 3270 compatible terminal can display data such as HTML data that conforms to Web standards, and can accept user inputs when the terminal is operating a 3270 communication session with a mainframe computer. Accordingly, a user can interact with a legacy mainframe computer using a browser. The browser can display a graphical user interface (GUI) to enhance user friendliness. User interactions with GUI can be communicated back to the mainframe in a hyper text markup language (HTML) language or other supported standard web content formats where the HTML is enveloped in a 3270 format.

In some embodiments, a 3270 compatible terminal, a middle tier 3270 type server or a secondary logical unit (SLU) can receive a 3270 type data steam that has embedded or encapsulated HTML or other Web/browser compatible protocol. The 3270 terminal or server can tightly integrate standard Web browser features such as those found in Microsoft Corporation's personal computer products.

Referring to FIG. 1A a high level block diagram of a mainframe-terminal or primary logical unit (PLU) connected to a secondary logical unit (SLU) system over a network is depicted. The system can include a PLU 106, a network 104 and a SLU 102. Only one SLU is depicted however many SLU could be coupled to a single PLU. The SLU 102 could be a 3270 compatible "terminal" that can emulate a traditional 3270 terminal and can provide additional features such as communicating with PLU using a browser or web compatible language such as a markup language. In some embodiments, the disclosed system can perform as a 3270 display terminal with browser capabilities and the browser can be viewed as a "plug-in" when the browser is active during a 3270 type communication session. The PLU 106 and SLU 102 may be co-located in the same rack or room or the PLU 106 and SLU 102 can operate together as a single integrated complex program or as several programs executing on the same computer. In other embodiments the SLU 102 could be remotely located from the PLU 106. The SLU 102 can contain 3270 emulation and browser capability.

Referring to FIG. 1B a high level block diagram of a mainframe/terminal system with a middle tier SLU 112 is depicted. The system can include a PLU 114, a SLU 112, a data network 110, and a remote computer 108. In this embodiment, a remote personal computer 108 can access the PLU 114 via a data network 110 and SLU middle tier server 112. The SLU 112 can act as a server that communicates with the PLU 114 using browser or Web compatible communications and the data in the web compatible language can be sent to remote computer 108 via the data network 110. In some embodiments the SLU 112 can communicate with the PLU 114 utilizing a markup language and the SLU 112 can send the communications over network 110 to the remote computer 108. The remote computer 108 could be located a long distance from the SLU 112. Further, the PLU 114 and could possibly be located a very long distance from the SLU 112. In addition the data network 110 could be the Internet or a private network. The middle tire SLU 112 can act as a server to remote computer 108 and provide a 3270 to HTML translation service.

Referring to FIG. 2 a SLU system 200 is disclosed where the SLU 203 can operate as a 3270 compatible terminal and provide browser functions in a 3270 mode. The SLU 203 can communicate with PLU 202 via the network 201. The SLU 203 can include a data stream manager 214, a trigger detector 212, a query reply module 210, a web event translator module 218, a display formatter 216, a session state module 206, a browser engine 220 and input/output (I/O) module 208. The I/O module 208 can include a display, keyboard, a mouse, or any user input/output device or user interface.

In operation, data formatted in a 3270 compatible format can be transmitted from the PLU 202 to the SLU 200 via the network 201. Some of this data may be in a browser compatible language and some may not be in a browser compatible language. When the PLU 202 sends browser compatible data, the trigger detector 212 can determine that the incoming data is browser compatible and the data stream manager 214 can send the browser compatible data to the browser engine 220 such that the browser engine 220 can process the data stream. When the data stream is not browser compatible the data steam manager 214 can send the traditional 3270 data to the 3270 display formatter 216 and the SLU 203 can process the data stream in a legacy configuration. Generally, the data stream manager 214 can receive the incoming data stream and act as a switch to activate and deactivate the web event translator 218 and browser 220 or the display formatter 216 based on the type of data that is received. In other embodiments, the data stream manager 214 can act as a switch or multiplexor to steer the incoming data stream to, or away from, the web event translator 218 and/or the display formatter 216.

The transmission received from the PLU 202 can be in the form of structured field content, and the transmission may or may not request a return transmission. When a return transmission is anticipated, the PLU 202 can configure itself to accept a return transmission. The data stream manager 214 can test the header in the transmission to determine if data is to be displayed or if data is to be returned to the PLU 202. When data is to be displayed but no return data is expected the data stream manager 214 can forward the data to the 3270 display formatter 216 and the legacy 3270 data can be displayed on display of the I/O module 208.

The display in the I/O module 208 can display received data until a new transmission is received from the PLU 202. In some embodiments, the PLU 202 can send a browser compatible transmission in a 3270 format that has embedded or encapsulated browser/web compatible data such as HTML formatted data. A control trigger can be created by, and sent from the PLU 202 to the SLU 203. The trigger can be placed in a header of the 3270 compatible data stream when the stream has Web compatible language contained in it. Trigger detector 212 can detect this trigger (specific characters in a specific location) and control the data stream manager 214 such that the data stream manager 214 routs the data stream to the Web event translator 218 which can process the Web compatible data.

The Web event translator 218 can un-encapsulate or decode the 3270 compatible data stream and strip out the Web compatible data and forward this data to the browser engine 220 that can display the data via the display as part of I/O 208. The transmission mode of the PLU 202 can be monitored by session state module 206 and if the SLU 203 exits a 3270 communication session, the session state monitor 206 can detect this and can provide a means for avoiding system errors, possibly by restoring a previous 3270 session.

In some embodiments, prior to a data transmission, the PLU 202 can send a query to the SLU 203 to determine the capabilities of the SLU 203. For example, the PLU 202 could send a query to see if the SLU 200 has a browser engine. To determine the capabilities a "Query Response Structured Field" as defined in the International Business Machine 3270 Data Stream Programmer's Reference GA23-0059-07 copyright IBM Corp. 1981, 1992 can be sent by the PLU 202 to the query reply module 210. If the SLU 200 can affirm the query (such that the SLU 203 has a browser engine 220 or some form hyper-text mark-up language processing functionality) then the query reply module 210 can affirm the query by sending a reply to the PLU 202. In some embodiments, the PLU 202 can send a query with a device code of "4F" in a hexadecimal format to the SLU 203 and the query reply module 210 can interpret this as a device query identifier requesting affirmation that a browser processing capability exists in the SLU 203.

The SLU 203 can use a query response structured field to send a reply sequence to the PLU 202 if the SLU 200 supports a Web compatible language or supports some form of browser or markup language. When the SLU 200 is operating in a traditional 3270 display mode, each transmission can contain data that is placed in a screen template. When the SLU 200 receives a trigger that precedes the data, the trigger detect module 212 can control the data stream manager 214 to send the transmission following the trigger to the Web event translator 218.

Trigger detector module 212 can detect such a trigger in the transmission and initiate and sustain a display of the HTML data on the display via browser engine 220. When blocks of data are received by the data stream manager 214 that do not have a trigger, the data steam manager 214 can revert back to the 3270 legacy operating mode where the data stream can be routed to the 3270 display formatter 216 and correspondingly, the data can be displayed. Each data block transmitted that contains Web compatible content can utilize a device identifier to uniquely identify a SLU 203 in a query request and such controls can be incorporated into a structured field header at the front of each transmitted block. The device identifier can also be utilized as the trigger that can sustain the SLU 200 in the Web or browser mode.

As stated above, the data stream can be received by the SLU 203 and the trigger detector 212 can determine the data stream contains a trigger. In some embodiments, the trigger detector module 212 can monitor the structured field of the transmission and when the trigger module receives "4F" hexadecimal device code in a specific location in the transmission, the trigger detector 212 can send a signal to the data stream manager 214 such that the data stream manager 214 can switch the SLU 203 into a browser mode or Web compatible mode. If there is no trigger detected by the trigger detector module 212, then the data stream can be processed as a standard legacy 3270 steam by the 3270 display formatter 216 and the data can be displayed on display. If a trigger is detected by the trigger detector module 212, then the data stream manager 214 can switch modes and provide the data stream to the Web event translator 218 which can un-encapsulate or strip the Web compatible data out of the 3270 format and send this data to the browser engine 202.

In some embodiments, the browser engine 220 can be software instructions that are loaded into a processor and executed in response to the detection of a trigger. If the data stream does not have a trigger present, then the data stream manager 214 can initialize the 3270 display formatter 216 to process the legacy type data for display. The display formatter 216 can format the received 3270 for display by the I/O 208. Such a formatting process can depend on the type of display utilized.

In some embodiments, the SLU 200 can seamlessly blend features provided by legacy 3270 terminals with Web content processing features provided by browser operating on a personal computer. When the SLU 200 is displaying Web type content, such as a data received in an HTML format, a user can perform a function, possibly using the graphical user interface (GUI) managed by the browser engine 202 that can activate requests to the PLU 202 for additional content. Such a request via user interactions with the GUI can generate a HTML request in a 3270 compatible format which can be sent to the PLU 202.

When such a user request for service from the PLU 202 is made, the SLU 200 can acquire the user input and transmit a 3270 compatible transmission with embedded browser compatible data, such as data that has a standard markup language encoded or encapsulated in the 3270 format to the PLU 202. User interactions captured by the browser engine 220 via the GUI can be referred to as "trapped" events. The browser engine 220 can convert the trapped events into a data steam that is 3270 compatible and activate a 3270"XMIT" signal. Thus, the keys on the keyboard that are part of the I/O-display 208 can retain 3270 functionality when the browser engine is controlling the display.

One of the features of the browser engine 202 is the ability in a Web/browser or HTML mode to hypertext link or "hyperlink" from one browsed page to other pages or to use a browser button to switch to a different page that may be delivered from elsewhere on the Web. This can create a problem if the controlling application in the PLU 202 is not kept synchronized with the change of display pages at the SLU 203. Again, such an out of sync condition can be caused by a user selecting a hypertext link in the GUI provided by the browser engine 220 when in a 3270 session. In some embodiments, a screen tagging method can be utilized by session state module 206 to track the current session. The session state module 206 can have a database that can store screens that have been and are currently being displayed and are believed to be the current display screen by the PLU 202. The session state module 206 and a screen management system at the PLU 202 can identify and correct or flag these screen conflict conditions.

Keystrokes inputs including function keys such as a cursor reposition input, tab functions, transmit keys, etc. of the I/O 208 can remain communicationally functional in a 3270 mode when the SLU 203 is in a browser mode. The browser engine 220 could include translation logic and a core library that can operate many different types of browser programs. The browser engine 220 could also have an open interface such that third party programs can invoke many different features including plug-ins.

Generally, the display in the I/O 208 can receive two types or feeds one feed from the browser engine 220 and another from the 3270 display formatter 216. In one embodiment, both feeds could produce an individual window where the windows could be visible concurrently on the display. In other embodiments, a feed can include a static data feed and a dynamic data feed. Static data typically consists of labels or designators that identify the purpose of related data where the related data will often change. For data delivery, the dynamic data from an application program can be embedded into a template that is defined by static data. This form of rendering a screen can be accomplished with editing techniques. To prepare data for the display, the Web type data can be formatted into a stream of bytes that will cause the browser engine 220 to render the desired display. However, the data in the data stream may be formatted in an HTML language or other Web complaint content and in this case the data may not need any additional formatting.

In some embodiments, if the display data stream sent to the SLU 203 is Web and browser compatible it can be rendered on the display via the browser engine 220. In other embodiments, may be possible for the user to change the "focus" of the display to an entirely different server (for example by surfing the Internet) and then subsequently the browser engine 220 can send a transmission to the PLU 202. The PLU 202 may return a transmission that contains data that does not match the structure expected by the 3270 display formatter 216. Thus, the data transmitted by the PLU 202 can be "out-of-sync" with the status of the SLU 203. If processing continues without intervention, the 3270 display formatter 216 can fail because the dynamic data received may not have an appropriate template. The session state module 206 can monitor or track the current session of the data stream manager 214 and/or the browser engine 220.

The session state module 206 can store the last display data that was transmitted to the SLU 203, and the SLU 203 can handle an out-of-sync situation in one of several ways. In some embodiments the session state module 206 can control the display. The session state module 206 could clear the display and provide an error message on the display. In some embodiments the session state module 206 can facilitate a request on the display that the user start a new feed by pressing a specific key on the keyboard or the session state module 206 could use the display to request a user to invoke a specific command. In other embodiments an error message can be displayed on display 206 for a predetermined period of time (such as ten seconds) and then the session state module 206 could send a last displayed screen and the 3270 display formatter 216 can resend the last stored screen to the display to bring the system back into synchronization.

In some embodiments, the mismatched data (static/dynamic) or out of sync condition can be ignored or fixed and in other embodiments, the user can be prevented from leaving the current display for a different display by commanding a block of screen page directions and/or eliminating links that can be utilized to link to other websites. In yet other embodiments, the SLU 203 can be forced to remain connected to the PLU 202 such that the out of sync condition does not occur.

It can also be appreciated that the SLU 203 can default into a standard mode for full compatibility with 3270 applications that do not provide the disclosed features when no triggers are transmitted. Operation of the SLU 203 in the hybrid browser/3270 mode can be initiated and sustained if the transmitted data received contains triggers in data headers to initiate and sustain the mode. The SLU 302 can capture web browser types of action and events via a user interaction with the GUI and the data stream manager 214 can translate those actions and data into 3270 type terminal action commands and can transmit a corresponding data stream to the PLU 202.

If the SLU 203 receives a block in a data stream without a trigger, the data stream manager 214 can convert the data stream back to the display formatter 216 such that the SLU reverts back to traditional 3270 terminal behavior. The process of converting to traditional behavior can include automatically closing any web enabled display on the display, and presenting a 3270 type format on the display. Thereafter, the SLU 203 can exhibit traditional operations until another structured field with the specific device code of the web content enabling feature described herein is received.

Figure 3:
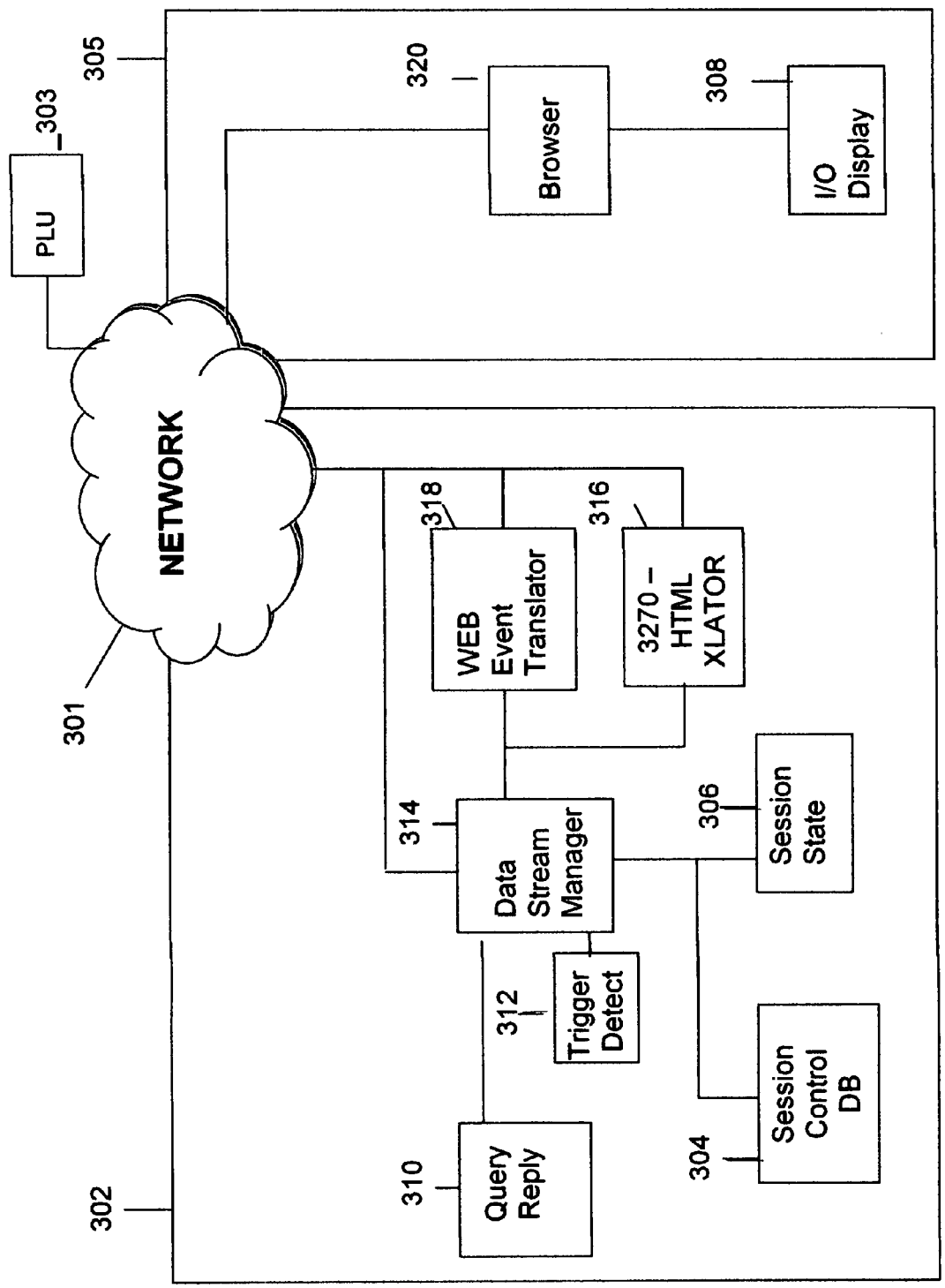
FIG. 3 is a block diagram of hybrid browser/3270 terminal for a mid tier embodiment.

Referring to FIG. 3, a SLU 302 is disclosed that can act as a middle tier server. It can be appreciated that the SLU 302 can be connected to the PLU 303 and the remote computer 305 over a network 301. The network 301 could be a secure private network or a network such as the Internet. The SLU 302 can include a data stream manager 314, a trigger detector 312 a query reply module 310, a web event translator module 318, a 3270/HTML translator 316, a session state module 306, and a session control database 304. The remote computer 305 can include a browser engine 320 and input/output (I/O) module 308. The I/O module 308 can include a display a keyboard and a mouse to name a few.

In some embodiments the PLU 302 can send browser compatible data using a 3270 protocol over the network 301 to the middle tier SLU 302. The SLU 302 can remove the browser compatible data from the 3270 compatible data stream and send the browser compatible data over the network 301 to the remote computer 305. Such a transmission can be done utilizing a TCP/IP protocol and could utilize some form of security such as encryption. In another embodiment the SLU 302 can receive standard 3270 data and convert this data to a TCP/IP format and send it to the remote computer 305. Thus, in some embodiments the SLU 302 can act as a translator.

Generally, the SLU 302 can operate similar to the SLU 202 described in FIG. 2, but may not require a display and can send out data over the network 301 to be displayed by remote computer 305. Actions created by user/browser interactions such as the activation of function keys can configure the browser engine 320 to transmit a TCP/IP compatible stream with commands back to the SLU 302. Inputs from the I/O module 308 can alert the browser engine 320 that it is not processing in the same computer (the SLU) as described in FIG. 2 and thus, the browser engine 320 can process the commands and convert them such that the commands can be sent to the SLU 302 and then back to the PLU 302. The processing features describe as a single unit in FIG. 2 have been split apart in FIG. 3 such that the browser engine program 320 is remotely located and can provide additional translations when it receives I/O commands.

It can be appreciated that only one remote computer 305 is illustrated, however the SLU 302 could server many remote computers (not shown). In some embodiments, the session control/database 304 can monitor each remote computer (such as remote computer 305). In operation middle tier SLU 302 can receive login information from the remote computer 305 via a TCP/IP network such as network 301 with a browser and can open a communication session. Session control database 304 can convert the SNA session to a web address by means of an address conversion table stored in the database 304. The session conversion table can be built as users via remote terminals connect to the SLU server 302. Table entries can be removed by means of a session timeout timer or when a user logout sequence is completed.

Input to the remote computer 305 can include activation of function keys and commands resulting from activation of such 3270 function keys can be transmitted via a TCP/IP protocol and the network 301 to the data stream manager 314. The browser engine 320 can read from the data steam returned by the I/O device 308 and the browser engine 320 can capture actions or events from key strokes, mouse movements, or inputs from other data entry devices, and code these actions/instructions for transmission over the network 301. Thus, the browser engine 320 can accept and execute 3270 type input commands. If the middle tier server 302 is deployed to serve a group of SLU's that operate in a similar fashion and the default mode is to transmit legacy 3270 data streams, any new session originating in a TCP/IP environment can be completed by the middle tier server 302 using a logon script stored in the server 302.

Figure 4:
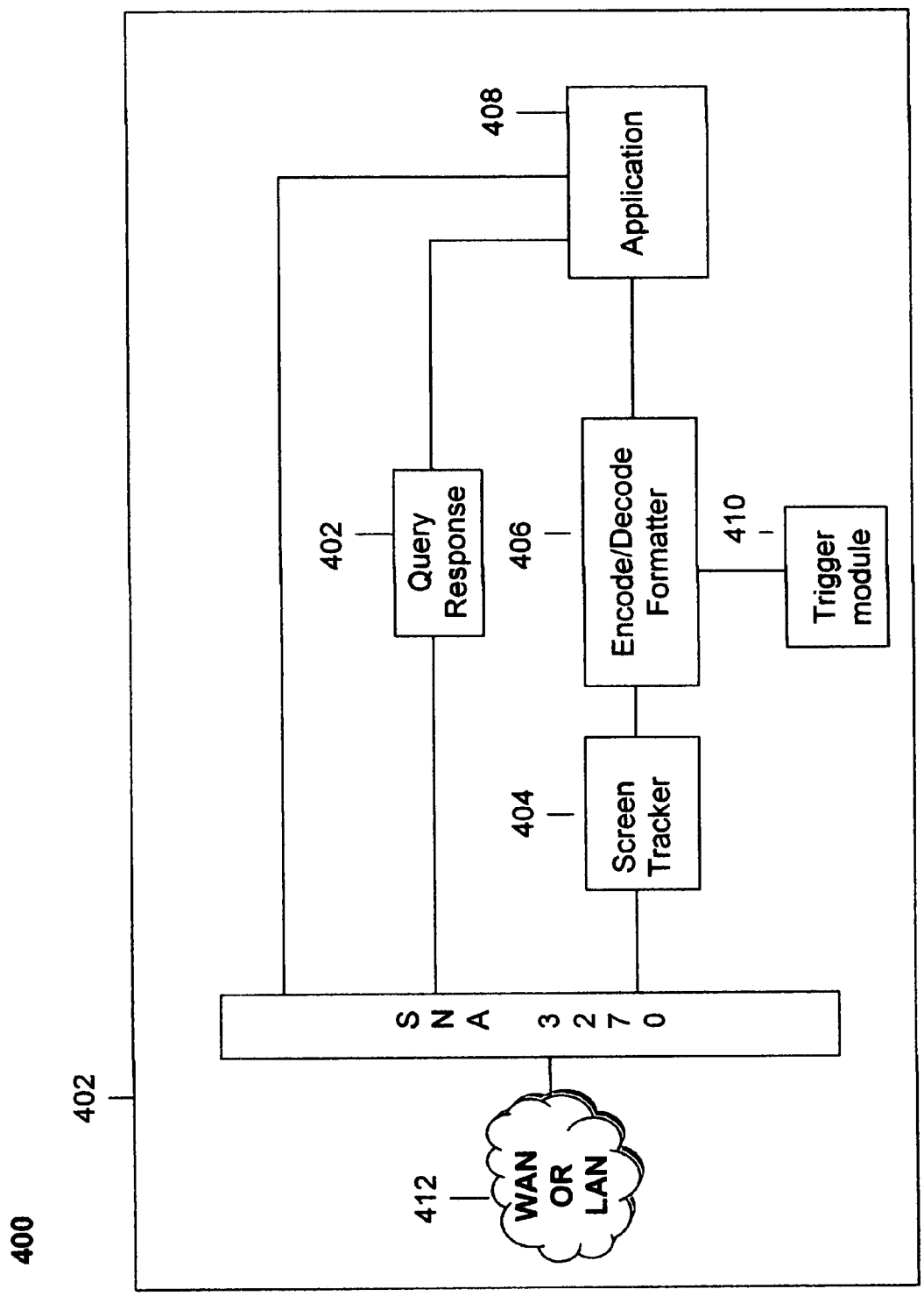
FIG. 4 is a block diagram of a PLU.

Referring to FIG. 4, a high level PLU system 400 is depicted. The system 400 can include an application 408, a query response module 402, an encoder/decoder/formatter 406, a trigger module 410 and a screen tracker 404. The system 400 can communicate over a SNA 3270 bus to a wide area network (WAN) or local area network (LAN) or nearly any type of network 412.

In operation, application 408 can execute instructions and communicate with SLU's via the network 412. Application 408 can be a program the runs on the PLU 400 and responds to input commands and can process data in response to requests. PLU 402 can be a mainframe class of computing system such as an IBM 360. The application 408 can be written in COBOL or C language or some other high order language.

The query response module 402 can generate a query that requests a capability of an SLU that is connected to the PLU 402 as described above. In some embodiments the capability can be a web compatible capability. In such an embodiment trigger module 410 can generate the trigger to switch an SLU into a web compatible mode during a specific transmission. Encoder/decoder formatter 406 can prepare data for transmission. Screen tracker 404 can tag and or store the last screen data sent to assist in keeping the application 408 synchronized with what is currently being displayed.

Figure 5:
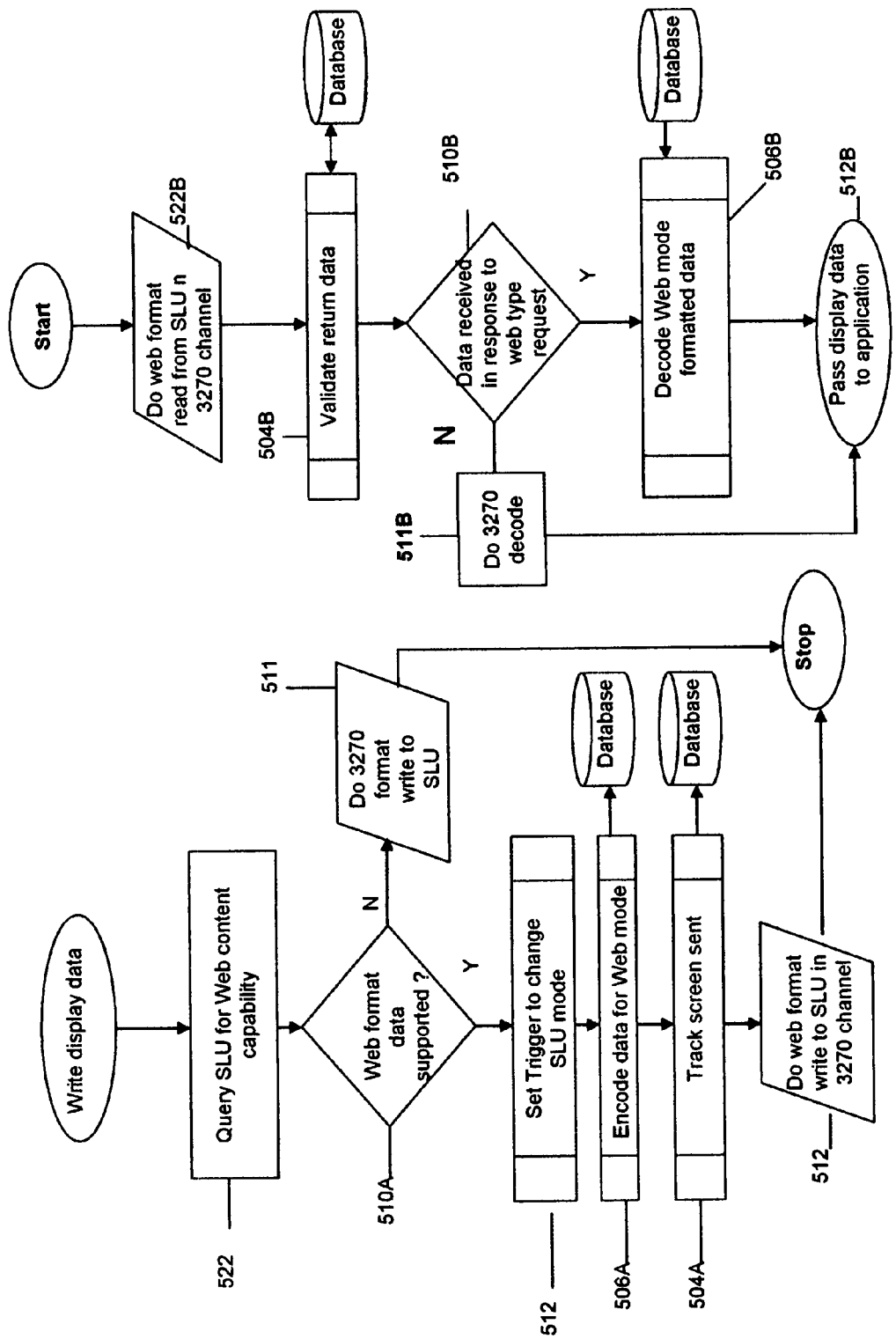
FIG. 5A is a flow diagram of a method for operating a 3270 compatible terminal with browser capability in a write mode.
FIG. 5B is a flow diagram of a method for operating a 3270 compatible terminal with browser capability in a receive mode.

Referring to FIG. 5A a flow diagram of a method for operating a 3270 compatible terminal with an integrated browser in a write mode is disclosed. As illustrated by block 522, the PLU can query an SLU to determine if the SLU has a browser capability. The application can utilize a 3270 structured query command to inquire if the client SLU supports a browser mode by issuing a query ID code and an SLU identifier. In some embodiments, an ID code of 4F hexadecimal can be utilized to initiate the query. As illustrated by decision block 510A, if an HTML/browser mode is not supported by the SLU, then the client SLU can return a blank or null character. If an HTML or web content mode is not supported by a SLU the PLU and its application program can send traditional 3270 data to the SLU for display and the process can end thereafter. If at decision block 510A, browser, HTML or some other Web type format is supported, the PLU application program can send a trigger to change the mode of the SLU such that a Web compatible application in the SLU can process the subsequent transmission, as illustrated by block 512. The browser compatible transmission can be encoded in a 320 format as illustrated by block 506A. The data sent or display data sent can be tracked, as illustrated by block 504A and the web data can be decoded at the SLU and displayed to the user as illustrated by block 512. The process can end thereafter.

In some instances, the data may already be formatted in HTML or some other web content standard and in this case the data can by-pass the formatting at block 512. If the data is in Extended Binary Coded Decimal (EBCDIC) it can be translated to American National Standards Code for Information Interchange (ASCII) or to a Double Byte Character Set (DBCS) standard for international web content browser engines. Character set translation can also occur as part of the formatting process. Performing the translation permits the PLU to transmit small embedded images in addition to plain text without the need of a picture server but at the cost of increased 3270 network load.

Data return from the browser engine to the PLU can contain data returned as a series of field identifier tags and content values. These tag and value pairs can be parsed into a table and mapped into the PLU application memory using the same or similar pre-stored structure that was used to originally create the data to be displayed.

In some embodiments, the display form can be tagged and the tag and display form can be stored in memory before the display data is transmitted from PLU to the SLU. The tag can be placed on the browser compatible data in such a way that the same tag can be returned with the user interaction with the GUI. Typically, only dynamic display content and field tags are returned with the HTML from user input to the PLU. It can be appreciated that the display data can be reliably tagged such that dynamic data can be returned by the SLU without alteration. HTML based browser engine features may be used for screen tagging. Such screen tagging can include insertion of fields containing the PLU transaction, the program identifier, the screen name, a PLU user identifier or other unique identifiers that can be placed into a display field that has invisible attributes. Such invisible attributes can be turned on or can be sorted in returnable locations on the display page.

The return data that contains a screen tag can be compared to the tag that was stored when the display data stream was transmitted. If return tag can be matched to the stored tag the application can receive the data mapped into its memory. If the tags do not match, the PLU can assume that the current screen is not the screen that was previously transmitted and the SLU and PLU are out of sync. If the system is out of sync, the SLU can determine what user selected option has been selected to handle the out-of sync condition. For example, the user may select to repaint the screen, display an error message or display an error message for a preset time and then the re-display the last page sent by the PLU.

Referring to FIG. 5B, PLU interactions during a receive operation are disclosed. Generally FIG. 5B represents a receive process that can occur in a PLU after the SLU has been queried and the PLU has determined that the SLU can process Web compatible transmissions. Thus, Web compatible data created by the PLU application can be encoded and a trigger can be added to the data stream. As illustrated by block 522B, an SLU can perform a read of a Web format from a 3270 compatible data stream. The SLU can determine if the 3270 compatible data stream has requested return data possible a validation transmission and can send such a return transmission, as illustrated by block 504.

As illustrate by decision block 510B, a PLU can determined if a received transmission is occurring when the SLU is in a browser or Web compatibility mode. Alternately, the PLU can determine if the transmission coming from the SLU is a traditional 3270 transmission of a browser type transmission that is requesting a Web type action from the PLU. If the data is not in response to a web type request, a decode of the 3270 data stream can be done as illustrated by block 511*b* and the data can be displayed as illustrated by block 512B. If the data or request received is a Web type request then the data can be decoded in a Web data processing mode as illustrated by block 506B. Generally, at decision block 510B data that is received from the SLU can be processed differently depending on whether a last PLU transmission to the SLU contained a trigger. Thus, the PLU can assume that the returned data is a Web type command because the SLU is still in a triggered or browser state.

Alternately described, if the last outbound data for the session contains a trigger, then the return data can be passed to the PLU with an event translation such that the PLU application can act as a Web server. If the last outbound data for the session did not contain a trigger then the return data can be processed as a traditional 3270 format which can be passed to a session control with event translation.

Figure 6:
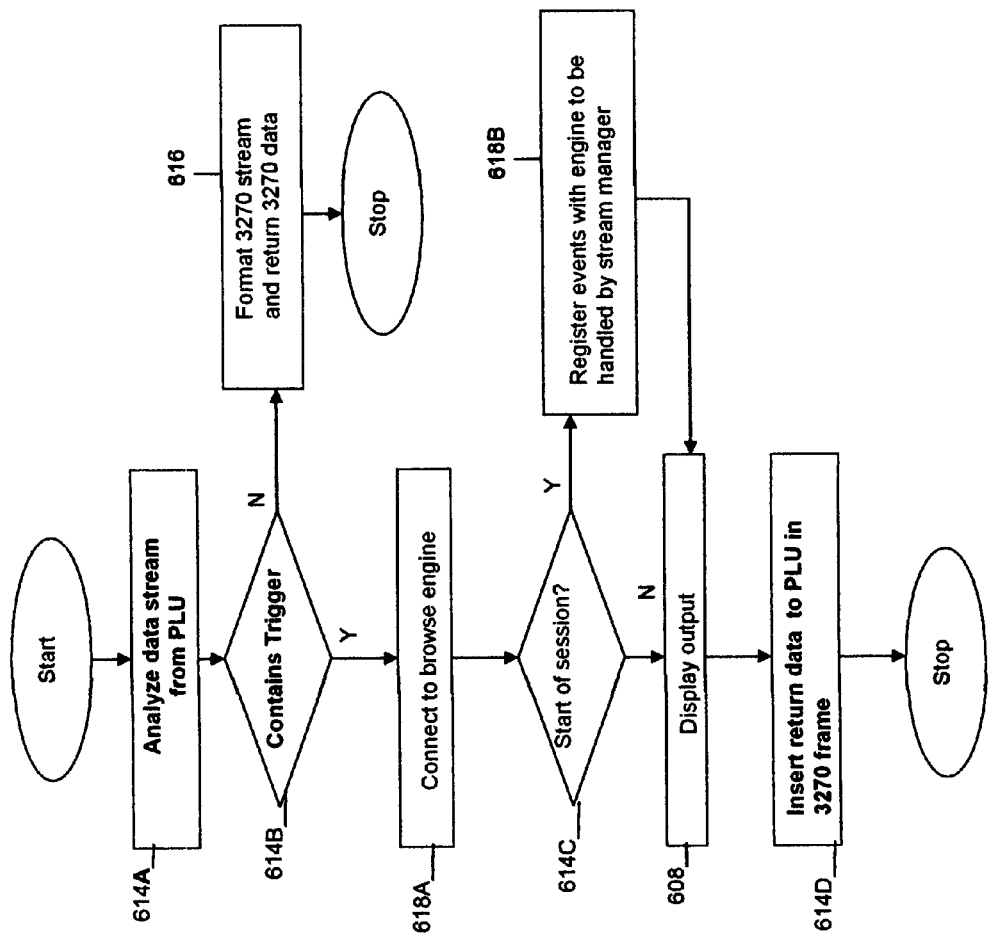
FIG. 6 is a flow diagram of a method for operating a 3270 compatible terminal with browser capability in a write mode; and, FIG. 7 is a flow diagram of a method for operating a 3270 compatible terminal with browser capability.

Referring to FIG. 6 a flow diagram depicting a method for operating a 3270 terminal is disclosed. As illustrated by block 614A, a SLU can analyze a data stream received from a PLU. As illustrated by decision block 614B, it can be determined if the data stream contains a trigger. If the data stream does not contain a trigger, then the data can be formatted in a 3270 compatible format and the captured data can be returned to the PLU. The process can end thereafter.

If as illustrated by decision block 614B, the transmission contains a trigger then the data stream can be connected to a browser engine as illustrated by block 618A. As illustrated by decision block 614C, it can be determined if this is a start of a session. If it is a start of a session then the events that will be handled by the stream manager can be registered as illustrated by block 618B.

When it is not a start of a session or the events have been registered, the data can be displayed as illustrated by block 608. In response to user interaction data can be inserted into a return data stream and the stream can be sent to the PLU in a 3270 compatible format as illustrated by block 614D. The process can end thereafter.

Figure 7:
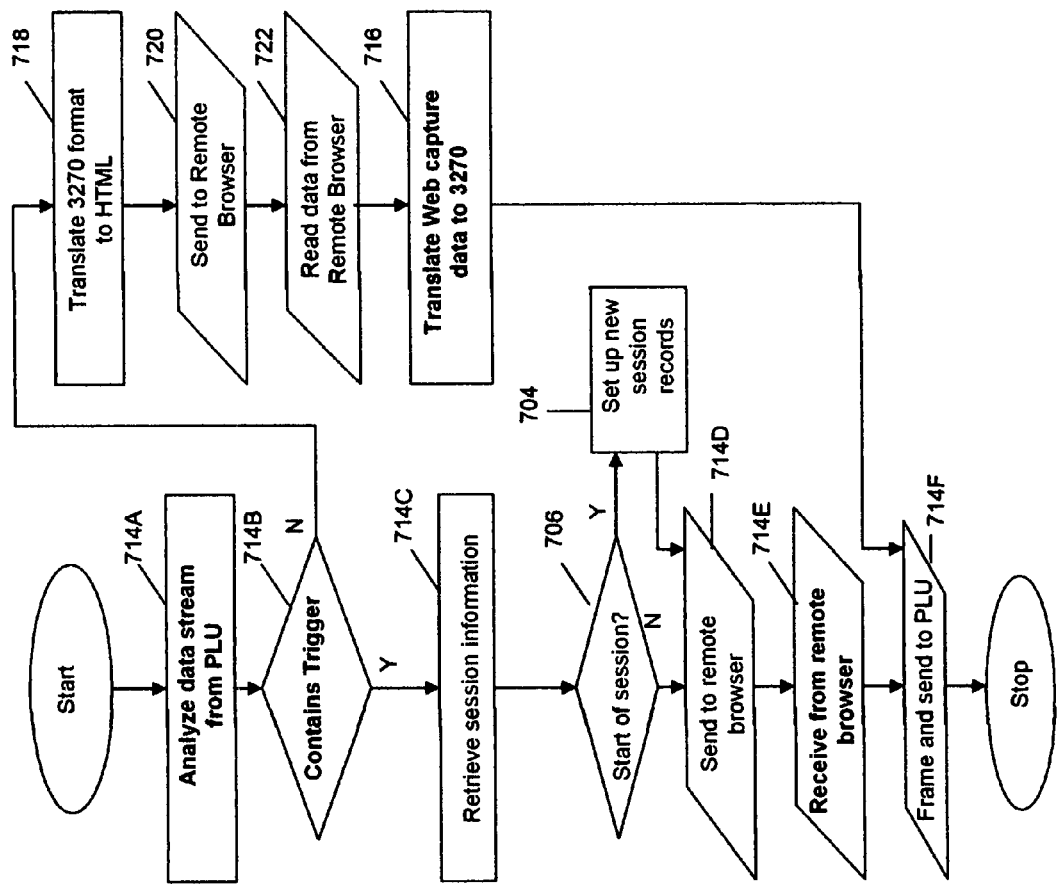

Referring to FIG. 7 a flow diagram for a middle tire 3270 server (MTS) arrangement is disclosed. As illustrated by block 714A, a MTS can receive and analyze a data stream received from a PLU. The MTS can determine if the data stream contains a trigger as illustrated decision block 714B. If the data stream contains a trigger then the data can be translated from a into a 3270 format to an HTML format as illustrated by block 718. As illustrated by block 720, the HTML data can be sent to a remote computer that has a browser engine as illustrated by block 720. The data can be read by the remote browser as illustrated by 722. The web type data can be captured and translated to a 3270 format.

When at decision block 714B the data does not contain a trigger the MTS the MTS can receive session information as illustrated by block 714C. At decision block 706, it can be determined if there is a start of session. When there is a start of session then new session records can be set up as illustrated in block 704. If it is not a start of session, records are set up or session records exist, the data can be sent to the remote computer and processed by the browser as illustrated by block 714E. The data can be framed and then sent to the PLU as illustrated by block 714F. The process can end thereafter.

Reference to particular configurations of hardware and/or software, those of skill in the art will realize that embodiments of the present invention may advantageously be implemented with other equivalent hardware and/or software systems. Aspects of the disclosure described herein may be stored or distributed on computer-readable media, including magnetic and optically readable and removable computer disks, as well as distributed electronically over the Internet or over other networks, including wireless networks. Data structures and transmission of data (including wireless transmission) particular to aspects of the disclosure are also encompassed within the scope of the disclosure.

It can be appreciated that the system allows for an easy migration pathway for existing systems such that new code can be loaded into an existing/legacy PLU and an existing SLU to provide the disclosed features. Also a system with many SLUs can be upgraded one SLU at a time. Thus, a system would not need to fully deploy all of the features disclosed herein all at once across an established network of PLUs and SLUs. Once installed at the PLU only one of many SLU could be upgraded and the upgraded SLU could perform the disclose operations Each process disclosed herein can be implemented with a software program. The software programs described herein may be operated on any type of computer, such as personal computer, server, etc. Any programs may be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet, intranet or other networks. Such signal-bearing media, when carrying computer-readable instructions that direct the functions of the disclosed arrangements, represent embodiments of the present disclosure.

The disclosed embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The system could be implemented as discrete system hardware, firmware (program patterns burned into in hardware memory devices), or computer software program products or it can be an embodiment combining software or hardware aspects of each. Furthermore, components of the system may be co-located in the same computer where the components can operate together as a single integrated complex program or they may be split across distances operating in a coordinated manner across local or global networks.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD. A data processing system suitable for storing and/or executing program code can include at least one processor, logic, or a state machine coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

It will be apparent to those skilled in the art having the benefit of this document that the present disclosure contemplates methods, systems, and media that provide a 3270 terminal with browser capability during a 3270 session. It is understood that the form of the invention shown and described in the detailed description and the drawings are to be taken merely as examples. It is intended that the following claims be interpreted broadly to embrace all the variations of the example embodiments disclosed.

What is claimed is:

1. A computer-implemented method comprising:
    initiating a communication session between a primary logic unit and a secondary logic unit, the communication session defined by a 3270 based protocol;
    querying the secondary logic unit during the communication session to determine if the secondary logic unit can process data in a browser compatible format;
    generating triggers during the communication session, to indicate that transmissions in the communication session have encapsulated the data in the browser compatible format when it is determined that the secondary logic unit can process the browser compatible format;
    activating a browser data encapsulation engine during the communication session to encapsulate the data in the browser compatible format in the 3270 based protocol by executing program instructions in the computer system;
    sending the trigger and the data in the browser encapsulated format using the 3270 based protocol during the communication session, the encapsulated data in the browser encapsulated format to be un-encapsulated as part of the communication session by executing program instructions in the computer system in response to receiving the trigger and not un-encapsulating data when a trigger is not received;
    detecting an out of sync condition when the currently displayed page is not the latest page received by a data stream manager; and
    implementing a corrective action when an out of sync condition is detected.

2. The method of claim 1, further comprising transmitting a reply to the query by the secondary logic unit in response to a browser format processing capability of the secondary logic unit.

3. The method of claim 1, further comprising displaying the data in a graphical user interface format.

4. The method of claim 3, further comprising detecting a trigger and changing a processing routine based on the detection of the trigger in the transmission, from a first legacy 3270 processing routine to an unbundling of the data into the browser compatible format.

5. The method of claim 1, further comprising receiving a 3270 compatible transmission and utilizing a 3270 legacy processing routine in response to receiving a transmission that does not have a trigger.

6. The method of claim 5, further comprising not activating the browser encapsulation engine when it is determined that the secondary logic unit cannot process data in a browser compatible format.

7. The method of claim 1, further comprising receiving a second transmission without a trigger and deactivating the browser engine.

8. The method of claim 1, wherein the data is in a hypertext markup language (HTML) format.

9. The method of claim 8, wherein the data is encapsulated in the 3270 based protocol.

10. The method of claim 1, further comprising un-encapsulating packets using the 3270 protocol layer and processing a second protocol layer in the transmission.

11. A computer system comprising:
    a memory storing:
    a query engine to query a client to determine if a client has browser functionality by executing program instruction in the computer system during a 3270 compatible communication session;
    a 3270 data stream manager module to process a 3270 compatible data generated using a 3270 compatible application, the 3270 compatible application to envelope a browser compatible language into the 3270 compatible data stream during the communication session;
    a session state module to detect if a currently displayed page is not a latest received 3270 compatible transmission and to implement a corrective action when an out of sync condition is detected;
    a trigger module to transmit a trigger in 3270 compatible data stream, the trigger invoking the browser functionality of the client during the communication session; and
    a browser data de-encapsulation engine to receive, de-envelope and process the browser compatible language in response to the detected trigger by executing program instruction in the computer system during the communication session.

12. The system of claim 11, further comprising a switch to activate the browser data de-encapsulation engine and to provide at least a portion of the 3270 compatible data stream to the browser data de-encapsulation engine based on the detection of the trigger.

13. The system of claim 11, further comprising a switch to switch the 3270 compatible data stream to the browser data de-encapsulation engine in response to the trigger.

14. The system of claim 11, wherein the browser compatible language is hypertext mark-up language.

15. The system of claim 11, further comprising a query reply module to respond to a query regarding the browser functionality.

16. A non-transitory machine-accessible medium containing instructions which, when the instructions are executed by a computer system cause the computer system to perform operations, comprising:
    detecting a trigger in a transmission by executing program instruction in the computer system;
    receiving a transmission in a 3270 compatible format, the transmission including encapsulated browser compatible data;
    activating a browser engine in response to the detected trigger to by executing program instruction in the computer system;

detecting if a page that is currently displayed relates to a last received page and taking corrective action when the current page is the last received page; and processing the browser compatible data with the browser engine by executing program instruction in the computer system.

17. The non-transitory machine-accessible medium of claim 16, that when executed causes the computer system to receive a query in a transmission, the query to determine a processing capability of the computer system and transmitting a reply to the query when the processing capability is available.

18. The non-transitory machine-accessible medium of claim 16, that when executed causes the computer system to display the browser compatible data in a graphical user interface format.

19. The non-transitory machine-accessible medium of claim 16, that when executed causes the computer system to accept input responsive to user interactions with a graphical user interface and to transmit the trigger in response to the user interaction.

* * * * *